(12) United States Patent
King

(10) Patent No.: US 8,775,302 B2
(45) Date of Patent: *Jul. 8, 2014

(54) METHOD OF AND SYSTEM FOR MAKING PURCHASES OVER A COMPUTER NETWORK

(75) Inventor: Douglas W. King, Santa Maria, CA (US)

(73) Assignee: MasterCard International Incorporated, Purchase, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/802,326

(22) Filed: May 22, 2007

(65) Prior Publication Data

US 2007/0226137 A1    Sep. 27, 2007

Related U.S. Application Data

(63) Continuation of application No. 09/391,285, filed on Sep. 7, 1999, now Pat. No. 7,249,093.

(51) Int. Cl.
*G06Q 40/00* (2012.01)

(52) U.S. Cl.
USPC ............ 705/39; 705/26; 705/27; 705/72; 705/40

(58) Field of Classification Search
USPC .................... 705/26, 27, 72, 39, 40
See application file for complete search history.

(56) References Cited

U.S. PATENT DOCUMENTS

| | | | |
|---|---|---|---|
| 5,677,955 A | | 10/1997 | Doggett et al. |
| 5,708,422 A | * | 1/1998 | Blonder et al. ............ 340/5.41 |
| 5,790,677 A | | 8/1998 | Fox et al. |
| 5,903,721 A | * | 5/1999 | Sixtus ............................ 726/2 |
| 5,903,878 A | * | 5/1999 | Talati et al. ................... 705/26 |
| 5,963,647 A | | 10/1999 | Downing et al. |
| 6,029,151 A | | 2/2000 | Nikander |
| 6,076,068 A | | 6/2000 | DeLapa et al. |
| 6,260,024 B1 | | 7/2001 | Shkedy |
| 6,338,050 B1 | | 1/2002 | Conklin et al. |
| 6,560,581 B1 | | 5/2003 | Fox et al. |
| 6,694,300 B1 | | 2/2004 | Walker et al. |
| 7,249,093 B1 | * | 7/2007 | King ............................. 705/39 |

FOREIGN PATENT DOCUMENTS

| | | |
|---|---|---|
| EP | 0 935 221 B1 | 11/2005 |
| JP | 10-105603 A | 4/1998 |
| JP | 10-207946 A | 8/1998 |
| JP | 11-102404 A | 4/1999 |
| JP | 11-224236 A | 8/1999 |

* cited by examiner

*Primary Examiner* — Nga B. Nguyen
(74) *Attorney, Agent, or Firm* — Buckley, Maschoff & Talwalkar LLC

(57) ABSTRACT

A method of and system for making purchases over a computer network using an ATM card or the like is provided. In accordance with the invention, a consumer transmits his ATM card number over the network to an on-line merchant. The on-line merchant then forwards the ATM card number to a third party contractor, such as a bank, that will oversee and authorize the transaction. Simultaneously or thereafter, the consumer transmits his PIN over the network to the third party contractor, who verifies that the ATM card number and PIN are valid.

20 Claims, 14 Drawing Sheets

```
import java.io.*;
import java.net.*;
import java.util.*;
import java.util.Date ;
import com.ms.com.*;
import com.ms.asp.*;

public class JRoute
{
        public Socket socSocket;
        int m_iTimeout=10000;
        J8583 msg = new J8583();

public int init(String input)
        {

//VAR DECLARATIONS int port=0,ok=0;//CONNECTION PORT,CHECKSUM

String hostname="localhost";//DEFAULT

DataOutputStream theOutputStream;
                int parnum=8;
                String strInput="";

String cardNumber="",amount="",expirydate="",trannum="",tid="",mid="",unique="",goAway="";

try{

////////////////////////////////READ INI PARS
                        StringTokenizer tkToken = new StringTokenizer(input);

hostname = tkToken.nextToken();
                        port = Integer.parseInt(tkToken.nextToken());
                        m_iTimeout = Integer.parseInt(tkToken.nextToken());

/////////////////////////////

//CARD NEEDS TO BE SENT TO OKTOPUS
                                //BUILD MSG msg.addField(2,cardNumber);
                                msg.addField(4,amount);
                                msg.addField(14,expirydate);
                                msg.addField(37,"1");
                                msg.addField(41,tid);
                                msg.addField(42,mid);
                                msg.addField(61,unique);

//CREATE SOCKET
                                try
                                {
                                socSocket = new Socket(hostname,port);
                                socSocket.setSoTimeout(m_iTimeout);
                                socSocket.setTcpNoDelay(true);
                                }
                                catch (UnknownHostException e)
                                {
                                        return(-4); //HOST NOT FOUND
                                } catch(IOException sockErr)
                                {
                                        return(-3);
```

Fig. 5(a)

```
                            }
                            catch(Exception all)
                            {
                                    return(-2);
                            }
                            msg.sendData(socSocket);

}
                catch(Exception er)
                {
                        return(-1); //SEND ERROR
                }
                return(-1);
        }
        public int listenfordata()
        {
                //8583 CLASS
                msg.receive(socSocket);
                try
                {
                        if(msg.decide(socSocket)==0) //APPROVAL
                        {
                                try{
                                        return(0); //ITS GOOD
                                }
                                catch(Exception any)
                                {
                                        return(-2); //ERROR
                                }

}
                        else
                        {
                                return(1); //DENIED
                        }
                }
                catch(Exception e)
                {
                        return(-3); //ERRROR
                }
        }
}
import java.io.*;
import java.net.*;

public class J8583
{
        private byte m_baOut[] = new byte[1024]; //OUTGOING BUFFER
        private int m_baOutIndex=0; //0 BASED INDEX OF FILLED BYTES
        private DataOutputStream m_dosData;
        private BufferedInputStream m_bisInput;
        private int m_field[] = new int[30];
        private    String m_value[] = new String[30];

public J8583()
        {
                //CONSTRUCTOR
        }
        public void readFields()
        {
                int x=0;
                for(x=0;x<30;x++)
                        System.out.print(m_field[x]+"="+m_value[x]+"\n");
        }
```

Fig. 5(b)

```
public void addField(int field,String value)
{
        int x,j;
        j = value.length();
        m_baOut[m_baOutIndex] = (byte)field;
        m_baOutIndex++;

for(x=0;x < j ;x++) //THE INDEX IS ONE HIGH TO LEAVE A NULL BETWEEN FIELDS
                m_baOut[x+m_baOutIndex] = (byte)value.charAt(x);

m_baOutIndex += j+1;//RESET THE INDEX
}
public void sendData(Socket socLocal)
{
        try
        {
                //SEND
                m_dosData = new DataOutputStream(socLocal.getOutputStream());
                m_dosData.write(m_baOut,0,m_baOutIndex);
        }
        catch (UnknownHostException e)
        {
                        System.out.print(e);
                        System.exit(0);
        }
        catch(IOException sockErr)
        {
                System.out.print("Socket Connection: "+sockErr);
                System.exit(0);
        }
        catch(Exception all)
        {
                System.out.print("Socket Error: "+all);
                System.exit(0);
        }
}
public String resolveFieldValue(int fieldNumber)
{
        int x=0;
        for(x=0;x<30;x++)
                if(m_field[x]==fieldNumber)
                        return(m_value[x]);
        return("");
}
public void receive(Socket socLocal)
{
try
        {
                m_bisInput = new BufferedInputStream(socLocal.getInputStream());

int k=1,index=0;
                byte buf[] = new byte[1024];
                m_bisInput.read(buf,0,1024);

for(k=0;k<30;k++)//INITIALIZE THE NULL STRINGS
                        m_value[k]="";
                k=1;

m_field[index] = buf[index];        //FIRST FIELD MARKED BY FIRST BYTE
                while(k<1024)
                {
                        if(buf[k]!=0)
                        {
                                m_value[index]+=(char)buf[k++];
                        }
                        else
                        {
```

Fig. 5(c)

```
                        if(buf[k+1]==0)//END OF STREAM
                                break;
                        else
                        {
                                index++;
                                m_field[index] = buf[k+1];
                        //            System.out.print("|"+buf[k+1]+"|");
                                k+=2;
                        }
                }

}

}
        catch(IOException err)
        {
                //TIMEOUT

//System.out.print((nTimeout)/1000+" Second Timeout");
                try
                {socLocal.close();}
                catch(IOException Error){System.out.print("p"+Error);}

}
        catch(Exception all)
        {
                //MOST LIKELY A CLOSE ON IQ
                System.out.print("Network Connection Closed " + all);
                //redirect(urlTimeout);
        }
}
public int decide(Socket socLocal)
{
        int k=0,index=0;
        byte pResult=0;

for(k=0;k<30;k++)
                if(m_field[k]==39)//GRAB PIN FIELD
                        pResult=(byte)m_value[k].charAt(0);

try{socLocal.close();}
                catch(IOException e){} if(pResult==48)//0 IS APPROVED
                {
//System.out.print("Thank You For Shopping At Electronic Paycheck");
                        return(0);
                }
                else
                {
//System.out.print("Denied");
                        return(1);
                }
        }
}
```

Fig. 5(a)

```
// webhostDlg.cpp : implementation file
// include "stdafx.h"
include "webhost.h"
#include "webhostDlg.h"

include <afxtempl.h> // list ifndef TimeOut
define TimeOut 200
endif define TimerID 0x4000 ifdef _DEBUG
define new DEBUG_NEW
#undef THIS_FILE
static char THIS_FILE[] = __FILE__;
endif /////////////////////////////////////////////////////////////////////////////
// CAboutDlg dialog used for App About class CAboutDlg : public CDialog
{
public:
        CAboutDlg();

// Dialog Data
        //{{AFX_DATA(CAboutDlg)
        enum { IDD = IDD_ABOUTBOX };
        //}}AFX_DATA // ClassWizard generated virtual function overrides
        //{{AFX_VIRTUAL(CAboutDlg)
        protected:
        virtual void DoDataExchange(CDataExchange* pDX);   // DDX/DDV support
        //}}AFX_VIRTUAL // Implementation
protected:
        //{{AFX_MSG(CAboutDlg)
        //}}AFX_MSG
        DECLARE_MESSAGE_MAP()
};

CAboutDlg::CAboutDlg() : CDialog(CAboutDlg::IDD)
{
        //{{AFX_DATA_INIT(CAboutDlg)
        //}}AFX_DATA_INIT
} void CAboutDlg::DoDataExchange(CDataExchange* pDX)
{
        CDialog::DoDataExchange(pDX);
        //{{AFX_DATA_MAP(CAboutDlg)
        //}}AFX_DATA_MAP
}

BEGIN_MESSAGE_MAP(CAboutDlg, CDialog)
        //{{AFX_MSG_MAP(CAboutDlg)
                // No message handlers
        //}}AFX_MSG_MAP
END_MESSAGE_MAP()

/////////////////////////////////////////////////////////////////////////////
// CWebhostDlg dialog CWebhostDlg::CWebhostDlg(CWnd* pParent /*=NULL*/)
```

Fig. 6(a)

```
                : CDialog(CWebhostDlg::IDD, pParent)
        {
                //{{AFX_DATA_INIT(CWebhostDlg)
                m_in = 0;
                m_out = 0;
                m_q = _T("");
                //}}AFX_DATA_INIT
                // Note that LoadIcon does not require a subsequent DestroyIcon in Win32
                m_hIcon = AfxGetApp()->LoadIcon(IDR_MAINFRAME);
        } void CWebhostDlg::DoDataExchange(CDataExchange* pDX)
        {
                CDialog::DoDataExchange(pDX);
                //{{AFX_DATA_MAP(CWebhostDlg)
                DDX_Control(pDX, IDC_LST, m_lst);
                DDX_Text(pDX, IDC_IN, m_in);
                DDX_Text(pDX, IDC_OUT, m_out);
                DDX_Text(pDX, IDC_Q, m_q);
                //}}AFX_DATA_MAP
        }

BEGIN_MESSAGE_MAP(CWebhostDlg, CDialog)
                //{{AFX_MSG_MAP(CWebhostDlg)
                ON_WM_SYSCOMMAND()
                ON_WM_PAINT()
                ON_WM_QUERYDRAGICON()
                ON_WM_TIMER()
                //}}AFX_MSG_MAP
        END_MESSAGE_MAP()

extern CWebhostApp theApp ;
        CWebhostDlg* pDlg ;
        char dbParam[256] ;

#include <ep_init.h>
        #include <format.h> define __STDC__
        #include <d3des.h>

EPsql sql ;
        Listener listener ;
        CList<Auth*,Auth*> Qa ;
        CList<EndPoint*,EndPoint*> Qe ;
        int matchF[]={ 2,14,41,42,61,0 } ; // f61=uniqueID, f44="5A315405018B44C4"
        unsigned char key[]={ 0x29, 0xda, 0x91, 0x0b, 0x80, 0x9b, 0xfe, 0xd3 } ;

CString sDebug ;

void Listener::OnAccept(int nErrorCode) {
          EndPoint* tmp=new EndPoint() ;
          if (Accept(*tmp)) tmp->init() ; else delete tmp ;
        } int EndPoint::respond() {
          const char *p ;
          char pkt[1024],*s=pkt ;
          int i,d[]={ 35,43,47,48,52,62,102,103,0 } ;
          if (getType()==0) return 0 ;
          i=0 ; while (d[i]) { set(d[i],NULL) ; i++ ; }
          for (i=2; i<128; i++)
          { if(p=get(i)) { *s=i ; strcpy(s+1,p) ; s+=strlen(p)+2 ; } }
          return Send(pkt,s-pkt) ;
        } int EndPoint::aging(int t) {
          if (t) { if (t==-1) sec-- ; else sec=t ; }
          return sec ;
        }
```

Fig. 6(b)

```
int EndPoint::match(M8583* m) {
  int f,i=0 ;
  while (f=matchF[i++]) if (strcmp(m->get(f),get(f))) return 0 ;
  return 1 ;
} void EndPoint::init() {
  char buf[32] ;
  CString ip0 ;
  UINT port ;
  BOOL nodelay=TRUE ;
  SetSockOpt(TCP_NODELAY,&nodelay,sizeof(BOOL),IPPROTO_TCP);
  sec=TimeOut ; Qe.AddTail(this) ; pDlg->m_in++ ;
  GetPeerName(ip0,port) ; ip=inet_addr(ip0) ;
  sprintf(buf,"Connect %08x",ip) ; pDlg->note(buf) ;
} void EndPoint::reject(int code) {
  char buf[32] ;
  sprintf(buf,"Reject %08x, code=%d",ip,code) ; pDlg->note(buf) ; sec=0 ;
  set(39,"100") ; set(44,buf+16) ; respond() ;
} void EndPoint::OnReceive(int nErrorCode) {
  Auth* a ;
  EndPoint* e=NULL ;
  POSITION pos1,pos2 ;
  BOOL fullTrans=TRUE ;
  short len,l,i,f ;
  const char* pp ;
  char *p,pin[24],pan[20],buf[1024],scode[]="1200", offset[]="0000" ;
  if (nErrorCode) { sec=0 ; return ; }
  len=Receive(buf,1020) ; buf[len]=0 ; p=buf; setType(1200) ; *pin=1 ;
  while (*p) {
    l=strlen(p) ; if ((*p==61)&&(l==2)&&(p[1]=='A')) fullTrans=FALSE ;
    if (set(*p,p+1,8)<1) { reject(*p) ; return ; }
    if ((*p==52)&&(l<14)) // clear PIN
     { *pin=0 ; pin[1]=l-1 ; strcpy(pin+2,p+1) ; memset(pin+l+1,15,10) ; }
    p+=(l+1) ; // build PIN block
  }
  if ((pp=get(52))&&(strncmp(pp,"F01",3)==0)) { reject(52) ; return ; }
  i=0 ; while (f=matchF[i++]) if (get(f)==NULL) { reject(f) ; return ; }
  if (*pin==0) { // got clear PIN, build PAN block, update PIN block
    strcpy(pan,offset) ; strncpy(pan+4,get(2)+strlen(get(2))-13,12) ;
    p=pin ; for (i=0; i<16; i++) { *p=(*p^pan[i])&15 ; p++ ; }
    for (i=0; i<8; i++) pin[i]=(pin[i*2]<<4)+pin[i*2+1] ;
    deskey(key,0) ; des((unsigned char*)pin,(unsigned char*)pan) ;
    for (i=0; i<8; i++) bin2hex(pin+i*2,pan[i]) ; pin[16]=0 ; set(52,pin) ;
    strcpy(buf,get(2)) ; strcat(buf,"=") ; strcat(buf,get(14)) ;
    strcat(buf,scode) ; strcat(buf,offset) ; set(35,buf) ;
  } // service code and offset hardcoded
  if (fullTrans) {
    pos2=Qe.GetHeadPosition() ;
    while (pos2) {
      pos1=pos2 ; e=Qe.GetNext(pos2) ;
      if (!match(e)||(e==this)) e=NULL ; else { Qe.RemoveAt(pos1) ; break ; }
    }
  }
  if (!fullTrans||fullTrans&&e)
  { a=new Auth(this,e) ; Qa.AddTail(a) ; Qe.RemoveAt(Qe.Find(this)) ; }
  sprintf(buf,"Recv %08x %d, card=%s",ip,len,get(2)) ; pDlg->note(buf) ;
}

Auth::Auth(EndPoint* e1, EndPoint* e2) {
  int i ;
  const char* p ;
  char f[16],dest[4]="N?" ;
  e[0]=e1 ; e[1]=e2 ; cp(*e1) ;
  if (e2) {
```

Fig. 6(c)

```
    if (e2->getType()==1200) setType(1200) ; set(3,"000000") ;
     for (i=2; i<128; i++) if (p=e2->get(i)) set(i,p) ;
   } else { set(3,"300000") ; set(4,"000000000000") ; }
  if (fillMsg(*this,sql,dbParam,3)) // 1: BIN, 2: mid/tid
   { e1->reject(1) ; if (e2) e2->reject(1) ; setType(0) ; return ; }
  id=++pDlg->m_out ; pDlg->UpdateData(FALSE) ;
  set(37,itoa(id,f,10),8) ; pDlg->m_ep.cp(*this) ;
  dest[1]=*(get(47)+1) ; pDlg->m_ep.send(dest) ;
}

BOOL Auth::isActive() {
  if ((e[1]==NULL)||(e[0]->aging(0)>0)&&(e[1]->aging(0)>0)) return TRUE ;
  setType(0) ; return FALSE ;
}

Auth::~Auth() {
  for (int i=0; i<2; i++) if (e[i])
   { e[i]->cp(*this) ; e[i]->respond() ; delete e[i] ; }
  setType(0) ;
}

/////////////////////////////////////////////////////////////////////
// CWebhostDlg message handlers BOOL CWebhostDlg::OnInitDialog()
{
        CDialog::OnInitDialog();

// Add "About..." menu item to system menu.

// IDM_ABOUTBOX must be in the system command range.
        ASSERT((IDM_ABOUTBOX & 0xFFF0) == IDM_ABOUTBOX);
        ASSERT(IDM_ABOUTBOX < 0xF000);

CMenu* pSysMenu = GetSystemMenu(FALSE);
        if (pSysMenu != NULL)
        {
                CString strAboutMenu;
                strAboutMenu.LoadString(IDS_ABOUTBOX);
                if (!strAboutMenu.IsEmpty())
                {
                        pSysMenu->AppendMenu(MF_SEPARATOR);
                        pSysMenu->AppendMenu(MF_STRING, IDM_ABOUTBOX, strAboutMenu);
                }
        }

// Set the icon for this dialog.  The framework does this automatically
        //  when the application's main window is not a dialog
        SetIcon(m_hIcon, TRUE);          // Set big icon
        SetIcon(m_hIcon, FALSE);         // Set small icon // TODO: Add extra initialization here
  char IP[256],name[4],title[16] ;
  short TCPort,port ;
  const char fmt[]="%s %hd %2s %s %hd %s" ;
  const char usage[]="Usage: webhost IP port name DBparam listenPort" ;
  if (sscanf(theApp.m_lpCmdLine,fmt,IP,&TCPort,name,dbParam,&port)<5)
   { ::MessageBox(NULL,usage,"Error",MB_OK) ; EndDialog(0) ; return FALSE ; }
  sprintf(title,"WebHost %s %d",name,port) ; SetWindowText(title) ;
  if (!listener.Create(port)) {
    ::MessageBox(NULL,"Unable to create TCP/IP sockets.","Error",MB_OK) ;
    EndDialog(0) ; return FALSE ;
  }
  if (!listener.Listen()) {
    ::MessageBox(NULL,"Network error.","Error",MB_OK) ;
    EndDialog(0) ; return FALSE ;
  }
  if (m_ep.connect(IP,TCPort,name)) {
    ::MessageBox(NULL,"Error connecting to EProute.","Error",MB_OK) ;
    EndDialog(0) ; return FALSE ;
```

Fig. 6(d)

```
}
    pDlg=this ; SetTimer(TimerID,1000,NULL) ;
            return TRUE;  // return TRUE unless you set the focus to a control
} void CWebhostDlg::OnSysCommand(UINT nID, LPARAM lParam)
{
            if ((nID & 0xFFF0) == IDM_ABOUTBOX)
            {
                    CAboutDlg dlgAbout;
                    dlgAbout.DoModal();
            }
            else
            {
                    CDialog::OnSysCommand(nID, lParam);
            }
}

// If you add a minimize button to your dialog, you will need the code below
//  to draw the icon. For MFC applications using the document/view model,
//  this is automatically done for you by the framework.

void CWebhostDlg::OnPaint()
{
            if (IsIconic())
            {
                    CPaintDC dc(this); // device context for painting SendMessage(WM_ICONERASEBKGND, (WPARAM) dc.GetSafeHdc(), 0);

// Center icon in client rectangle
                    int cxIcon = GetSystemMetrics(SM_CXICON);
                    int cyIcon = GetSystemMetrics(SM_CYICON);
                    CRect rect;
                    GetClientRect(&rect);
                    int x = (rect.Width() - cxIcon + 1) / 2;
                    int y = (rect.Height() - cyIcon + 1) / 2;

// Draw the icon
                    dc.DrawIcon(x, y, m_hIcon);
            }
            else
            {
                    CDialog::OnPaint();
            }
}

// The system calls this to obtain the cursor to display while the user drags
//  the minimized window.
HCURSOR CWebhostDlg::OnQueryDragIcon()
{
            return (HCURSOR) m_hIcon;
} void CWebhostDlg::OnTimer(UINT nIDEvent)
{
            // TODO: Add your message handler code here and/or call default
    Auth* a ;
    EndPoint* e ;
    POSITION pos1,pos2 ;
    BOOL del=FALSE ;
    if(nIDEvent==TimerID) {
      pos2=Qe.GetHeadPosition() ;
      while (pos2) {
       pos1=pos2 ; e=Qe.GetNext(pos2) ;
       if(e->aging()<1)  { Qe.RemoveAt(pos1) ; del=TRUE ; delete e ; }
      }
      pos2=Qa.GetHeadPosition() ;
      while (pos2) {
       pos1=pos2 ; a=Qa.GetNext(pos2) ;
```

Fig. 6(e)

```
    if (!a->isActive()) { Qa.RemoveAt(pos1) ; del=TRUE ; delete a ; }
  }
  if (del) note(NULL) ;
}
        CDialog::OnTimer(nIDEvent);
} void CWebhostDlg::note(const char* s) {
 if (s)
 { m_lst.AddString(s) ; if (m_lst.GetCount()>14) m_lst.DeleteString(0) ; }
 m_q.Format("%d %d",Qe.GetCount(),Qa.GetCount()) ; UpdateData(FALSE) ;
} void On8583(short mType, EPacket* ep) {
 int n,i ;
 char s[64] ;
 const char* p ;
 POSITION pos1,pos2 ;
 Auth* a ;
 if ((mType==-1)||ep->mustExit()) { pDlg->EndDialog(0) ; return ; }
 if (mType) return ; // ignore other administrative messages
 ep->receive() ; if (ep->getType()==1430) return ;
 if (p=ep->get(37)) n=atoi(p) ; else return ;
 pos2=Qa.GetHeadPosition() ;
 while (pos2) {
   pos1=pos2 ; a=Qa.GetNext(pos2) ;
   if (a->match(n)) {
     ep->set(37,NULL) ; for (i=2; i<128; i++) if (p=ep->get(i)) a->set(i,p) ;
     Qa.RemoveAt(pos1) ; delete a ; pDlg->note(NULL) ; return ;
   }
 }
 pDlg->note("reversal") ; ep->getType(s) ; memset(s+4,'0',18) ; s[22]=0 ;
 if (p=ep->get(11)) strncpy(s+4,p,6) ;
 if (p=ep->get(12)) strncpy(s+10,p,12) ;
 if (p=ep->get(32)) strcpy(s+22,p) ;
 ep->set(56,s) ; ep->setType(1420) ; ep->send(ep->getSender()) ;
}
/*
sDebug.Format("") ;
::MessageBox(NULL,sDebug,"Debug",MB_OK) ;
*/
```

Fig. 6(f)

though the present invention is to

METHOD OF AND SYSTEM FOR MAKING PURCHASES OVER A COMPUTER NETWORK

This application is a continuation of U.S. Ser. No. 09/391,285, filed Sep. 7, 1999, now U.S. Pat. No. 7,249,093 the entire disclosure of which is hereby incorporated by reference in its entirety.

BACKGROUND OF THE INVENTION

1. Field of the Invention

The present invention generally relates to a method of and system for making purchases over a computer network and, more particularly, to a method of and system for making purchases of goods and services over the Internet or other non-secure computer network using an automated-teller-machine (ATM) card, debit card or any other card which may require a valid personal-identification-number (PIN) for transaction authorization.

2. Description of the Prior Art

The use of personal computers by consumers to purchase goods and services over the Internet via the World Wide Web and e-mail has become very popular in recent years and constitutes an ever-increasing part of the economy. In making a purchase over the Internet, the typical consumer uses a credit card or ATM card. After making his purchase selection, the consumer transmits his card information over the Internet to the on-line merchant. The on-line merchant then contacts the issuing bank to verify the card information and obtain authorization to complete the transaction. Depending on the response from the bank, the on-line merchant either accepts or rejects the purchase.

Because the Internet is a non-secure (i.e., public) network, there is a danger that the consumer's credit card or ATM card information will be intercepted by a third party. If that third party is dishonest, he can make illegal charges to the credit card or, in the case of an ATM card, remove money directly from the consumer's bank account. In recent years, numerous approaches have been implemented to reduce this security risk. The most popular approach has been sophisticated encryption techniques which render the credit card or ATM card data virtually unreadable to third parties, such as 128-bit secure-sockets-layer (SSL) encryption.

When making purchases over the Internet using an ATM card, however, security considerations take on an added importance because, unlike with transactions at ATM machines, PINs are presently not used in ATM transactions on the Internet. Thus, should the ATM card number fall into the hands of an unscrupulous third party, the card-holder's entire bank account can be wiped out through fraudulent Internet transactions.

One way to overcome this problem is to require the use of PINs in ATM transactions on the Internet. This has not been possible to date, however, because on-line merchants do not have the ability to verify PINs. Additionally, it is not desirable to provide the on-line merchant with both the ATM card number and the corresponding PIN since unscrupulous employees of the on-line merchant can use the PIN to illegally access the card-holder's bank account and withdraw money therefrom.

Accordingly, it is an object of the present invention to provide a new method of and system for making purchases over the Internet using an ATM card wherein a valid PIN is required in order to obtain authorization for a given transaction. It is another object of the present invention to provide a new method of and system for making purchases over the Internet using an ATM card wherein a valid PIN is required in order to obtain authorization for a given transaction, and wherein the PIN is not supplied to the on-line merchant.

SUMMARY OF THE INVENTION

In accordance with a first aspect of the present invention, a method of making purchases over a non-secure computer network using an ATM card is provided. In accordance with said method, a consumer transmits his ATM card number over the network to an on-line merchant. The on-line merchant then forwards the ATM card number to a third party contractor, such as a bank, that will oversee and authorize the transaction. Simultaneously or thereafter, the consumer transmits his PIN over the network to the third party contractor, bypassing the on-line merchant. Having both the ATM card number and the PIN, the third party contractor verifies that the ATM card number and PIN are correct, checks for sufficiency of funds, and either authorizes or denies the transaction. The authorization or denial is communicated to the on-line merchant over the network, who either completes or rejects the purchase and so notifies the consumer.

In accordance with a second aspect of the present invention, a system for making purchases over a non-secure computer network using an ATM card is provided. The system includes first, second and third computers connected to a computer network. The first computer transmits the consumer's ATM card number over the network to the second computer, which is operated by or for the on-line merchant. The second computer forwards the ATM card number over the network to the third computer, which is operated by or for the third party contractor. Simultaneously or thereafter, the first computer transmits the consumer's PIN over the network to the third computer, bypassing the second computer. The third computer then verifies that the ATM card number and PIN are correct and that there are sufficient finds in the bank account to cover the transaction amount. The third computer then transmits the results of the verification procedure to the second computer, which forwards the results to the first computer. Depending on the verification results, the purchase is either completed or rejected.

The present invention will now be described in detail, with frequent reference being made to the drawings identified below.

BRIEF DESCRIPTION OF THE DRAWINGS

In the accompanying drawings:

FIGS. 5(a)-(d) show a computer program which can be used to format the data package sent from the second computer to the third computer in ISO 8583 format; and FIGS. 6(a)-(f) show a computer program which can be used by the third computer to synchronize the data packages received from the first and second computers.

DESCRIPTION OF THE PREFERRED EMBODIMENT

Figure 1:
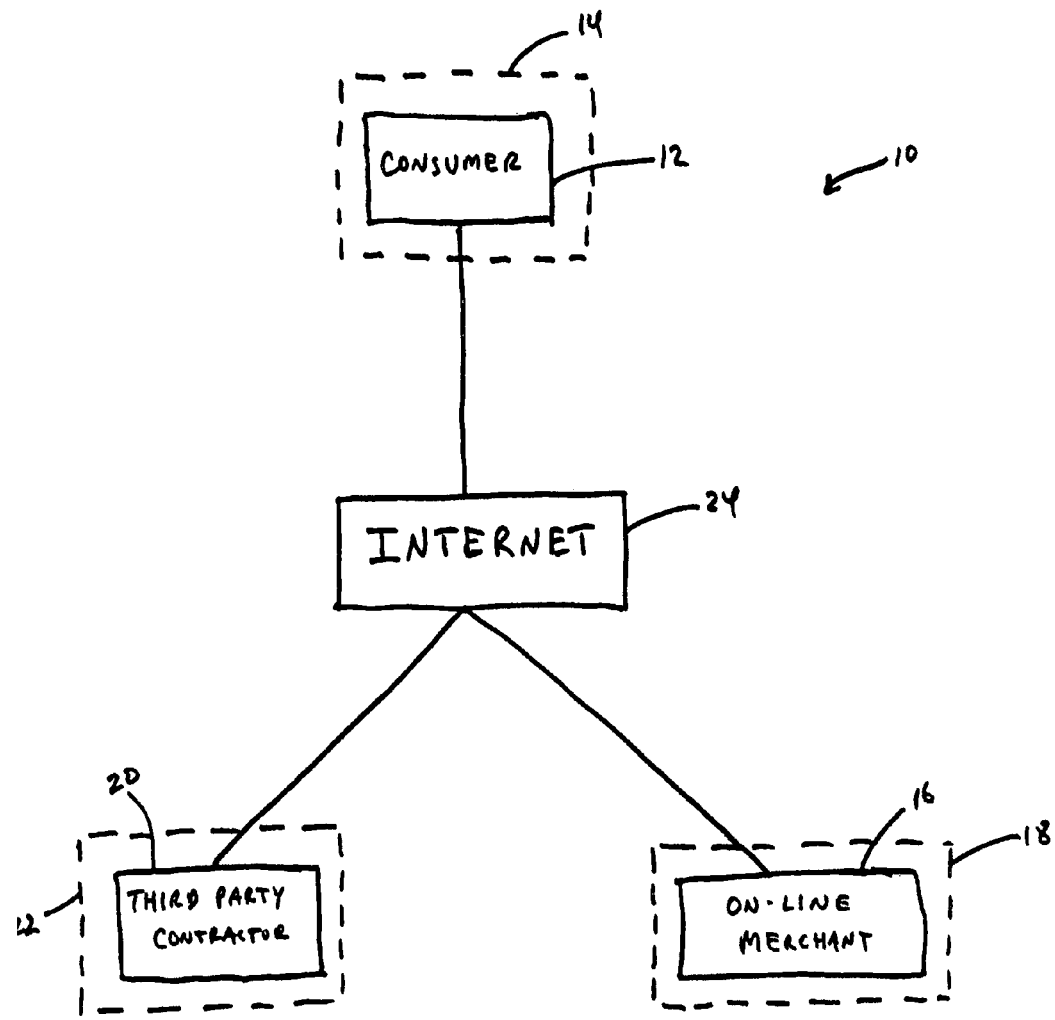
FIG. 1 is a schematic diagram of the system in accordance with the present invention.

The system 10 in accordance with the present invention is schematically shown in FIG. 1. The system 10 includes a first computer 12 at a consumer location 14, a second computer 16 at an on-line merchant location 18, and a third computer 20 at a third party contractor location 22. The three computers 12, 16, 20 are connected together over a computer network 24 which, for purposes of this discussion, is the Internet, although the present invention may be practiced on any computer network. As those of ordinary skill in the art know, the Internet 24 is a complex and amorphous computer network that comprises thousands of nodes and components and over which signals are transmitted by telephone lines, satellites and optical fibers.

The first computer 12, which will generally be located at the consumer's home or business (consumer location 14), will typically be a conventional personal computer (PC) that includes a chassis that houses a central processing unit (CPU) and supporting circuitry, as well as a floppy drive, a hard drive and an internal modem. Connected to the CPU through the chassis are a keyboard, a mouse and a monitor. The keyboard and mouse are used by the consumer to control the operation of the first computer 12 and to input information into the first computer 12. The first computer 12 will usually be coupled to the Internet via a telephone line connected to the modem, although the computer can be connected to the Internet via a high speed data transmission line. The consumer will typically connect to the Internet using an Internet service provider, such as Erols™ or America OnLine™, but may have a direct connection to the Internet.

Although a conventional PC will typically be used by the consumer, the consumer may use any type of computer that can be connected to the Internet, including a work station on a local area network, and any operating system. The particular details of the first computer 12 are largely irrelevant to the present invention. The first computer 12 merely serves as a convenient interface for the consumer to place orders for goods and services over the Internet.

Next shown in FIG. 1 is the second computer 16 which is located at the on-line merchant location 18. The second computer 16 will preferably be a more powerful machine than a personal computer, such as a workstation, although a personal computer may also be used by the on-line merchant. Again, the particular details of the second computer 16 are largely irrelevant to the present invention.

Typically, the second computer 16 will be a Web server (a computer that provides direct access to the World Wide Web on the Internet and includes the necessary hardware, operating system, Web server software, TCP/IP protocols and Web site content) owned and operated by the on-line merchant or by an Internet service provider with whom the on-line merchant has contracted. For purposes of this discussion, the on-line merchant location 18 refers to the location of the second computer 16, and not necessarily the actual physical location of the on-line merchant.

Preferably, the second computer 16 will be running Windows NT™ 4.0, using Internet Information Server™ 4.0 and Commerce Server™ 3.0. The CPU of the second computer 16 must have acceptable power and should have at least 64 megabytes of RAM.

The second computer 16 will typically have an on-line catalog in memory which can be accessed and browsed by the consumer over the Internet 24 through an appropriate graphical use interface (GUI) supplied by the on-line merchant.

Next shown in FIG. 1 is the third computer 20 which is located at the third party contractor location 22. The third party contractor is an independent, insured organization, such as a bank, that has contracted with the on-line merchant to provide ATM services. Although the third computer 20 can be a personal computer, as with the second computer 16 it will preferably be a much more powerful machine, such as a workstation. The third computer 20 is likewise preferably a Web server owned and operated by the third party contractor or by an Internet service provider with whom the third party contractor has contracted. The third party contractor location 22 refers to the location of the third computer 20 and not necessarily the actual physical location of the third party contractor. As with the first and second computers 12, 16, the particular details of the third computer 20 are largely irrelevant to the present invention, so long as the third computer 20 is capable of performing the functions described herein. Preferably, the third computer is Compaq ProLiant™ server running at 500 MHZ with 128 MB RAM and using Windows NT™ 4.0.

Figure 2:
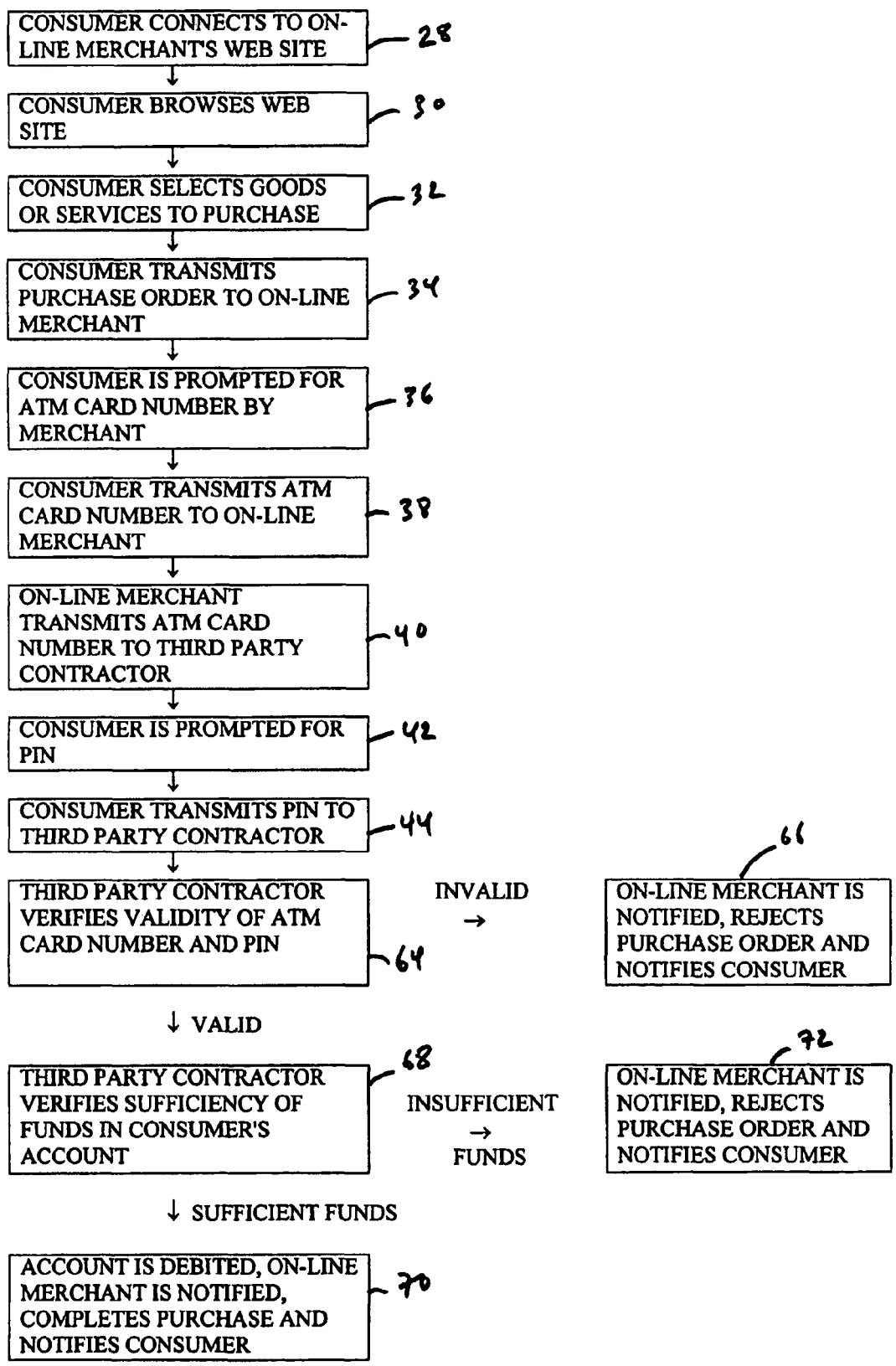
FIG. 2 is a flow chart which illustrates how the system of FIG. 1 operates.

The flow chart 26 provided in FIG. 2 illustrates how the system 10 operates. As shown in block 28, the consumer initially establishes a connection over the Internet between the first computer 12 and the second computer 16 by accessing the on-line merchant's Web site using a commercially available browser, such as Internet Explorer™ or Netscape Navigator™. Then, as shown in blocks 30 and 32, using a GUI supplied by the on-line merchant, the consumer browses the on-line catalog, selecting which goods and/or services he wishes to purchase. Once the consumer makes his selection and is ready to place an order, the consumer transmits a purchase order message over the Internet to the on-line merchant (block 34).

The consumer is then prompted for his payment information, as indicated in block 36, which for purposes of the present discussion is an ATM card number and expiration date, although the payment information can include additional data such as the consumer's name and address. The consumer then transmits his payment information over the Internet to the on-line merchant, as indicated in block 38. As used herein, the term "ATM card" includes bank cards, debit cards and any other cards for which the issuing bank or organization may require a valid PIN for use. The payment information is transmitted over the Internet using an encrypted connection, such as 128-bit encryption SSL.

When the on-line merchant receives the ATM card number, or earlier, the second computer 16 creates a unique session identifier by combining the consumer's IP address, which uniquely identifies the consumer, with a date/time stamp. The ATM card number is then forwarded, or echoed, over the Internet by the second computer 16 to the third computer 20 at the third party contractor location 22 (block 40), along with the unique session identifier, a merchant id which uniquely identifies the on-line merchant, a terminal id which identifies the terminal being used by the on-line merchant, the expiration date of the ATM card and the purchase price. This data package is stored in memory on the third computer in a queue. Once again, 128-bit encryption SSL is preferably used.

The data package transmitted by the second computer 16 to the third computer 20 is transmitted in ISO 8583 format. ISO 8583 is a messaging standard established by the International Standards Organization for financial transaction card oriented messages which is used by all banks and credit card companies and which is well known to those of ordinary skill in the art. A sample computer program written in Java which creates the unique session identifier and formats the data package in ISO 8583 format is provided in FIG. 5. This program is designed to run as an Active Server Page on Internet Server 4.0 under Windows NT 4.0, although the program can be used on other platforms and programming environments, and can readily be implemented by one of ordinary skill in the art.

Simultaneously or soon thereafter, the second computer executes a hyperlink to the third computer and the consumer is prompted by the third computer to input his PIN (block 42). The consumer inputs his PIN into the first computer 12 and transmits it over the Internet to the third computer 20 (block 44). The connection between the first computer 12 and third computer 20 is encrypted and independent of the connection between the first computer 12 and the second computer 16 so that the on-line merchant is never in possession of the PIN. As with the second computer 16, the first computer 12 transmits the unique session identifier, the merchant id, the terminal id, the expiration date of the ATM card and the purchase price to the third computer 20 along with the PIN in a data package.

Figure 3:
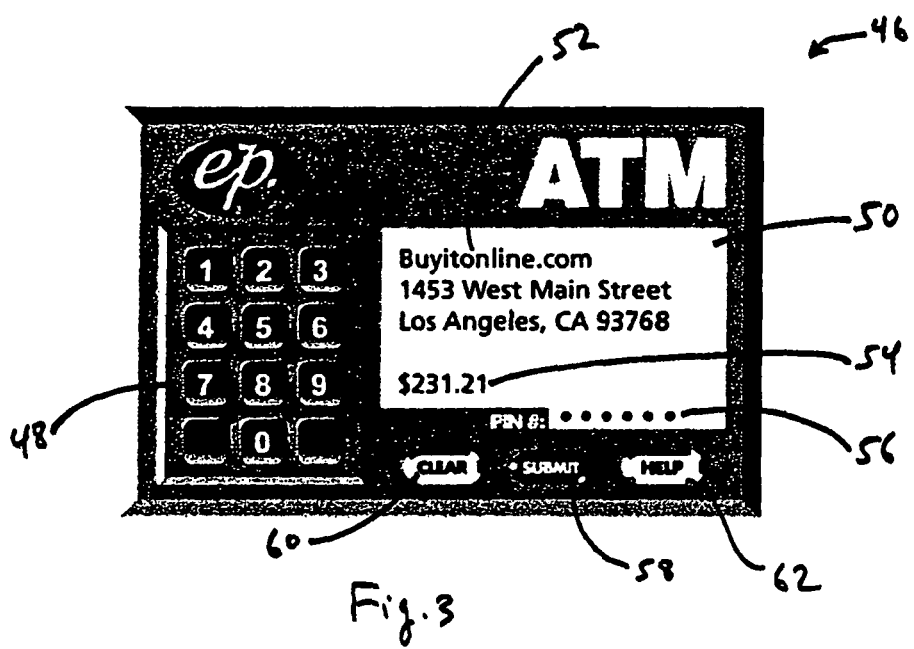
FIG. 3 shows a possible graphical user interface which can be used to enable the consumer to enter and transmit his PIN to the third party contractor.

FIG. 3 shows a typical GUI 46 which may be supplied by the third-party contractor and which pops up on the consumer's screen to allow the consumer to enter his PIN and transmit it to the third party contractor. As is clear from FIG. 3, the GUI 46 emulates an actual ATM machine and includes a simulated key pad 48 and a screen 50. The screen 50 indicates the on-line merchant's name and mailing address 52 and the purchase price 54. Using his mouse, the consumer inputs his PIN, as shown by the series of dots 56. By pressing the SUBMIT button 58, the PIN number is transmitted to the third party contractor. If the consumer makes a mistake, he presses the CLEAR button 60 and re-types his PIN. If the consumer needs help from the third party contractor, he simply presses the HELP button 62, which causes a help menu provided by the third party contractor to pop up on the screen, which may then be navigated by the consumer.

The third computer 20 next verifies that the ATM card number and PIN are valid (block 64). Because the third-party contractor may be overseeing multiple transactions at any given time, the third computer 20 must synchronize the data packages received from the first and second computers 12, 16. To do this, the third computer 20 matches the unique session identifier, the merchant id, the terminal id, the expiration date of the ATM card and the purchase price fields contained in the data packages received from the first and second computers 12, 16. A sample computer program for synchronizing the messages received from the first and second computers 12, 16 is provided in FIG. 6. The program is written in C++ and can readily be implemented by one of ordinary skill in the art. All of the forgoing data fields must match in order for the transaction to take place. For security reasons, a two minute window for matching is preferably implemented. If there is no match within the two minute window, the transaction is aborted.

Once the data packages from the first and second computers 12, 16 are synchronized by the third computer 20, the third computer checks the ATM card number and PIN. If the ATM card number and PIN are invalid, the third computer 20 so informs the second computer 16 and the on-line merchant rejects the purchase order and notifies the consumer (block 66). If the ATM card number and PIN are valid, the third computer 20 checks to see whether there are sufficient funds to cover the purchase price 56 (block 68). If there are sufficient funds in the account, the third computer transmits an authorization message to the second computer, debits the consumer's account, the purchase is completed and the consumer is notified (block 70). If there are insufficient finds, a rejection message is transmitted, the on-line merchant rejects the purchase and the consumer is notified (block 72).

If the ATM card was issued by the third party contractor, the verification steps (blocks 64 and 68) may be done by simply accessing an internal database in or connected to the third computer 20. If, however, the ATM card was issued by another bank, then the third party contractor must verify the card information by contacting the issuing bank, either directly over a secure line, through a private ATM network, such as CIRRUS, or through any other available avenue.

Figure 4:
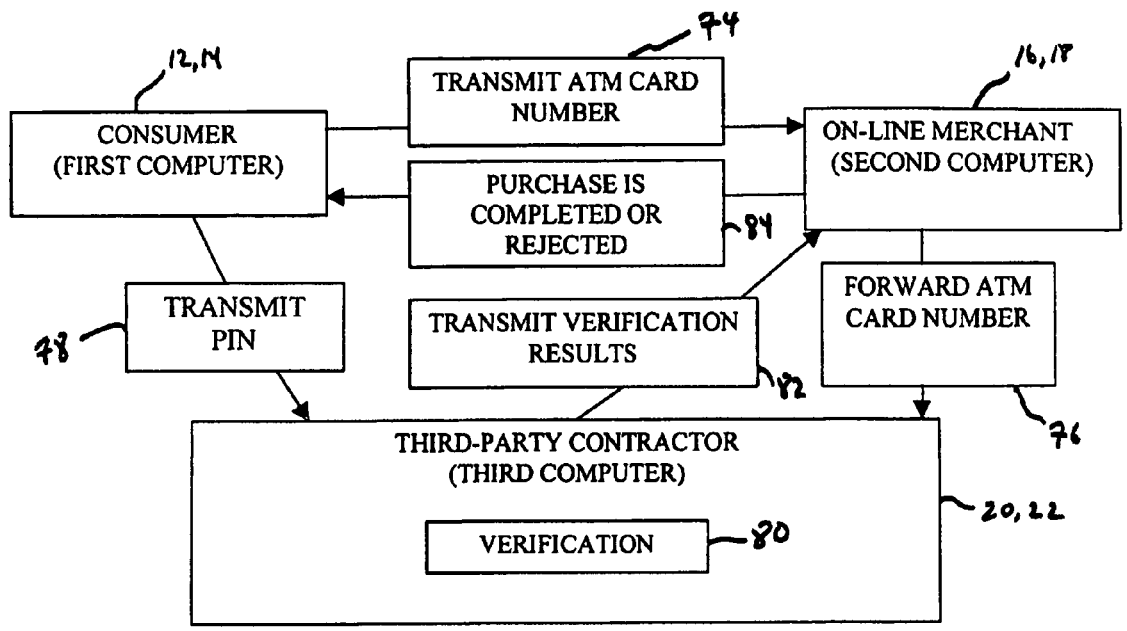
FIG. 4 is a diagram which summarizes the present invention.

The present invention is briefly and concisely summarized in FIG. 4. First, the consumer (first computer) transmits his ATM card number over the network to the on-line merchant (second computer) (block 74). Second, the on-line merchant forwards the ATM card number over the network to the third party contractor (third computer) (block 76). Third, the consumer transmits his PIN over the network to the third party contractor (block 78). As FIG. 4 indicates, the on-line merchant is completely bypassed and never receives the PIN. Fourth, the third party contractor verifies the ATM card number and PIN and checks for sufficiency of funds (block 80). Fifth, the third party contractor transmits the results of the verification process over the network to the on-line merchant (block 82). And sixth, the on-line merchant forwards the results over the network to the consumer, either completing or rejecting the purchase, depending on the verification results (block 84).

Thus, in accordance with the foregoing the objects of the present invention are achieved. Modifications to the present invention would be obvious to those of ordinary skill in the art, but would not bring the invention so modified beyond the scope of the appended claims.

What is claimed is:

1. A device for facilitating transactions over a computer network comprising:
   a communication port;
   a processor;
   a memory;
   and a program, wherein the program is stored in the memory and configured to be executed by the processor, the program including instructions for:
      receiving an account number from an on-line merchant location via a network, the account number identifying a consumer's account;
      transmitting, in response to said receiving said account number, a request for an authorization to a consumer location via the network;
      receiving said authorization from the consumer location via the network, the authorization which, when used with said account number, can enable a transfer of funds to or from said account, wherein said authorization is previously associated with said account number and is not revealed to said on-line merchant location;
      determining that said authorization is valid for said account number;
      determining that an account associated with said account number is authorized for the transfer of funds;
      transmitting an authorization signal to said merchant location indicating that said transfer of funds is approved.

2. The device of claim 1, wherein the program further receives a first data package from the consumer location and a second data package from the merchant location.

3. The device of claim 2, wherein the first data package comprises a first unique session identifier to identify a consumer, a first merchant identifier to identify a merchant, a first terminal identifier to identify a terminal that was used by the merchant, a first expiration date associated with the consumer's account, and a first purchase price associated with the consumer's account.

4. The device of claim 3, wherein the first unique session identifier comprises a combination of a consumer's IP address with a date/time stamp.

5. The device of claim 1, wherein the second data package comprises a second unique session identifier to identify a consumer, a second merchant identifier to identify a merchant, a second terminal identifier to identify a terminal that was used by the merchant, a second expiration date associated with the consumer's account, and a second purchase price associated with the consumer's account.

6. The device of claim 5, wherein the second unique session identifier comprises a combination of a consumer's IP address with a date/time stamp.

7. The device according to claim 1 wherein the program is further configured to:
synchronize receipt of the account number and the authorization message.

8. The device according to claim 7, wherein said synchronizing is accomplished within a pre-defined window of time.

9. The device according to claim 7 wherein synchronizing comprises:
matching each element of a first data package received from the consumer location with a respective element of a second data package received from the merchant location.

10. The device according to claim 1, wherein transmitting a request for said authorization to a consumer location comprises:
initiating a verification connection with the consumer location, the verification connection including a verification web browser window.

11. The device according to claim 1 wherein the consumer location is at the merchant location.

12. The device according to claim 1 wherein the received account number is encrypted.

13. The device according to claim 1 wherein the request for authorization is transmitted to a conventional PC used by a consumer.

14. The device according to claim 1 wherein the program further includes instructions for tokenizing the received account number as a string.

15. A system for facilitating transactions over a computer network comprising:
a communication port;
a processor;
a memory; and
a program, wherein the program is stored in the memory and configured to be executed by the processor, the program including instructions for:
means for receiving a data package from a merchant location via a computer network, the data package including a session identifier, electronic address for a consumer, merchant id, and purchase price;
means for transmitting a request for authorization to a consumer location of the consumer using the electronic address for the consumer;
means for receiving a data package from the consumer location via the computer network, the data package from the consumer location including a merchant id, transaction amount, at least a portion of an account number that identifies a consumer's account, and authorization from the consumer, wherein the authorization from the consumer is encrypted and allows a determination that the consumer's account associated with the account number is authorized for a transfer of funds;
means for synchronizing the data packages by matching at least the merchant id and transaction amount of the data packages;
means for determining whether there are sufficient funds to cover the transaction amount in the consumer's account; and
means for transmitting an authorization signal to the merchant location via the network indicating that the transfer of funds is approved.

16. The system of claim 15 wherein the synchronizing by matching is implemented in a predetermined window of time.

17. A device for facilitating transactions over a computer network comprising:
a communication port;
a processor;
a memory; and
a program, wherein the program is stored in the memory and configured to be executed by the processor, the program including instructions for:
receiving an account number from a consumer;
receiving an expiration date associated with the account number from the consumer;
receiving a forwarding of a web browser of a consumer from an on-line merchant web site, the forwarding including a unique session identifier that uniquely identifies the consumer;
transmitting a verification web browser window to the consumer, bypassing the merchant web site;
prompting for an authorization from the consumer for the account number;
receiving the authorization from the consumer, wherein the authorization is encrypted and is previously associated with the account number and is not revealed to the merchant web site;
determining whether there are sufficient funds to cover a transaction amount; and
transmitting a signal to the merchant indicating whether there are sufficient funds to cover the transaction amount.

18. The device of claim 17 further comprising program instructions for:
receiving the authorization from the consumer in a data package; and
synchronizing the received data packet with a data package from the on-line merchant web site using a merchant id and transaction amount.

19. The device of claim 17 wherein the program instructions determine whether there are sufficient funds to cover a transaction amount using a purchase price.

20. The device of claim 17 further comprising program instructions for:
transmitting a signal to the consumer indicating whether there are sufficient funds to cover the transaction amount.

* * * * *